United States Patent [19]

Gerth

[11] 4,037,496

[45] July 26, 1977

[54] COMBINATION SPINDLE-DRIVE SYSTEM FOR HIGH PRECISION MACHINING

[75] Inventor: Howard L. Gerth, Knoxville, Tenn.

[73] Assignee: The United States of America as represented by the United States Energy Research and Development Administration, Washington, D.C.

[21] Appl. No.: 719,637

[22] Filed: Sept. 1, 1976

[51] Int. Cl.² .............................................. B23B 19/02
[52] U.S. Cl. .................................................... 82/28 R
[58] Field of Search ....................................... 82/28, 30

[56] References Cited

U.S. PATENT DOCUMENTS

| | | | |
|---|---|---|---|
| 1,185,681 | 6/1916 | Kienzle | 82/28 R |
| 3,058,559 | 10/1962 | Ohrnberger | 82/30 |
| 3,710,466 | 1/1973 | Williamson et al. | 82/28 R |
| 3,752,019 | 8/1973 | Kaneko | 82/28 R |

FOREIGN PATENT DOCUMENTS 842,147   6/1952   Germany .............................. 82/28 R

*Primary Examiner*—Harrison L. Hinson
*Attorney, Agent, or Firm*—Dean E. Carlson; Stephen D. Hamel; David E. Breeden

[57] ABSTRACT

A combination spindle-drive is provided for fabrication of optical quality surface finishes. Both the spindle-and-drive utilize the spindle bearings for support, thereby removing the conventional drive-means bearings as a source of vibration. An airbearing spindle is modified to carry at the drive end a highly conductive cup-shaped rotor which is aligned with a stationary stator to produce torque in the cup-shaped rotor through the reaction of eddy currents induced in the rotor. This arrangement eliminates magnetic attraction forces and all force is in the form of torque on the cup-shaped rotor.

4 Claims, 2 Drawing Figures ns for high torque, it too introduces vibration due to slipping, eccentricitys in drive pulleys and variations in thickness in the drive belt. Further strides have been made in the use of airbearing spindles in combination with the flat-belt drive means, however, the vibration introduced by the flat-belt drive, especially in large machines, is not eliminated solely by the application of the airbearing spindle.

COMBINATION SPINDLE-DRIVE SYSTEM FOR HIGH PRECISION MACHINING

BACKGROUND OF THE INVENTION

This invention was made during the course of, or under, a contract with the United States Energy Research and Development Administration.

This invention relates generally to machining drive systems and more specifically to a drive system for precision machining in which an eddy current motor drive system is combined with a machine spindle which carries the drive motor rotor to substantially eliminate vibration inherent in conventional drive systems.

In precision machining, such as the production of metal mirrors required for high energy laser-optic systems, very precise vibration-free machining techniques are required to provide metal mirrors having very high reflectivity, low energy scattering, and very precise contour accuracy. It is desirable to machine these mirrors directly without the usual polishing techniques used in the prior art to produce the required surface finish.

In the art, various machines have been developed having a limited capability for producing mirrors with suitable surface finish using single point diamond cutting tools. Although great strides have been made in machining tools to allow precise positioning and accurate feeding of the cutting tool to traverse very complicated cutting paths, a problem remains, however, in that vibrations in the spindle drive for a machining lathe may prevent good surface finishes, especially of large diameter metal mirrors.

An attempt to reduce the vibration has taken the course of coupling the drive to the spindle through various belt drive designs. Although flat-belt designs have been used with fair success on some machines, as opposed to a V belt or timing belt for high torque, it too introduces vibration due to slipping, eccentricitys in drive pulleys and variations in thickness in the drive belt. Further strides have been made in the use of airbearing spindles in combination with the flat-belt drive means, however, the vibration introduced by the flat-belt drive, especially in large machines, is not eliminated solely by the application of the airbearing spindle.

Therefore, there is clearly a need for a drive system for a machining lathe in which the vibration caused by a drive system is substantially removed.

REFERENCE

U.S. Pat. No. 3,721,479, issued Mar. 20, 1973, for "Improved Gas Bearing And Method Of Making Same" to William H. Rasnick et al. and having a common assignee with the present invention.

SUMMARY OF THE INVENTION

In view of the above need, it is therefore the primary object of this invention to provide a combination spindle-drive system for a lathe which is substantially free of vibration of the workpiece being supported by the spindle.

Further, it is an object of this invention to provide a vibration-free spindle-drive system as in the above object in which an eddy current motor is directly coupled with a lathe spindle which carries the drive motor rotor.

Yet another object of this invention is to provide a spindle-drive system as in the above objects wherein extraneous non-torque forces are eliminatd from the drive means coupled with the lathe spindle.

Other objects and many of the attendant advantages of the present invention will be obvious from the following detailed description taken in conjunction with the drawings.

DETAILED DESCRIPTION

Figure 1:
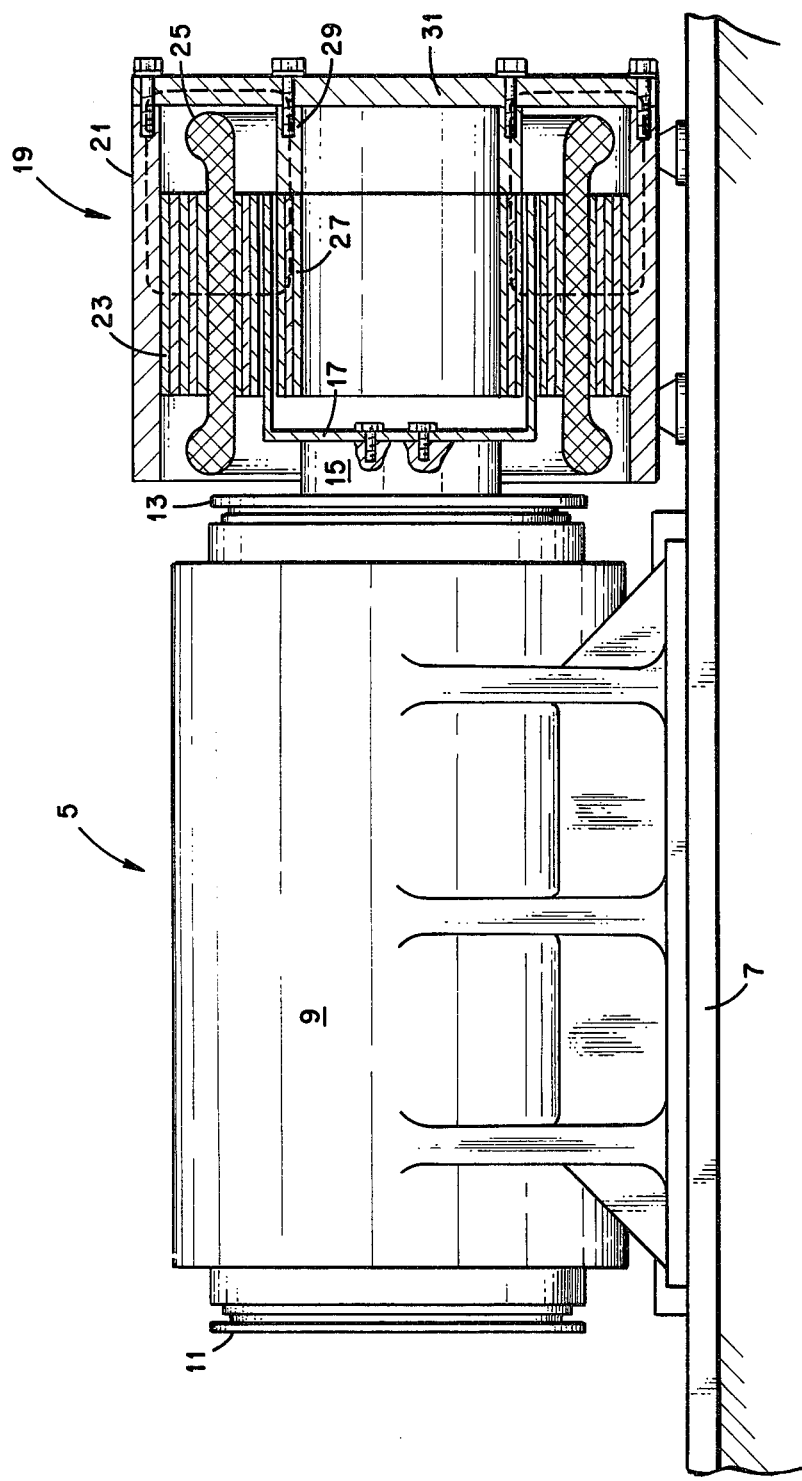
FIG. 1 is an elevation view, partially in section, of a motor-spindle arrangement according to the present invention.

Referring now to FIG. 1, the subject invention is illustrated in a preferred embodiment. A conventional airbearing spindle 5 is mounted on a base 7, such as the bed of a conventional metal turning lathe. The airbearing spindle 5 consists of a cylindrical spindle housing 9, a front end mounting plate 11 for supporting a workpiece in a cantilever fashion, and a drive end adapter plate 13. The front plate 11 and rear drive plate 13 are an integral part of the shaft supported by the spindle airbearing journals. Further details of the airbearing spindle may be had by referring to the above-referenced U.S. Pat. No. 3,721,479.

The drive end plate 13 of the spindle 5 is adapted to hold an axially aligned cylindrical spacer plate 15. A cup-shaped eddy current rotor 17 is secured to the plate 15 in a conventional manner, such as by bolting the base of the cup 17 to the plate 15, as shown. The rotor 17 is fully supported in a cantilever arrangement by the airbearing spindle and since there are no ferrous materials in the cup-shaped rotor in the area of the magnetic field, the only forces acting on the rotor when it is centered in the magnetic field will be in the form of torque through induced eddy current reaction with the rotating magnetic field produced by a polyphase stator assembly 19.

The rotor 17 extends in cantilever fashion into the stator assembly 19. The stator assembly 19 includes a metal housing 21 which may be readily adapted from a conventional induction motor housing having a laminated outer core portion 23. The outer core 23 is disposed about the outer wall of rotor 17. The core 23 is preferably wound with a three-phase winding 25 in a manner to produce a substantial number of poles, typically in the order of 12. This yields a more uniform magnetic field to produce smooth, uniform torque and better speed regulation from startup to over 1000 rpm. The speed is regulated by varying the frequency of a variable frequency three-phase AC power supply, not shown, connected to the winding 25 in a conventional manner. To complete the magnetic flux path, generally indicated by dashed lines passing through the stator core 23 and the housing 21, a soft iron, laminated inner core is provided preferably in the form of a cylinder 27 disposed adjacent the inner wall of cup 17 to form an air gap between the stator portion 23 and the cylinder 27 in which the cup-shaped rotor ratates. Thus, the inner core 27 forms a portion of the motor stator and is held in place and magnetically coupled to the stator outer core portion 23 by means of a spacer ring 29 affixed to the cylinder 27 to hold the core 27 in place coaxially within the stator core 23 by means of an end plate 31 to which the ring 29 is secured as shown in FIG. 1. The plate 31 is secured to the stator housing 21 and thus completes the magnetic path of the motor stator 19.

The core 27 may be formed from a conventional induction motor rotor by removing the inner shaft and machining the outer surface to increase the air gap space sufficiently to allow the rotor 17 to be positioned in the air gap. Thus, two air gaps are formed in the magnetic path, one between the stator outer core portion 23 and the rotor 17 outer wall and another between the inner core portion 27 and the rotor 17 inner wall. Typically, these air gaps are approximately 0.010 inch. To allow precise alignment of the stator 19 with the rotor cup 17, the stator 19 may be mounted on the base 7 by means of adjustable legs, not shown, which will allow relatively convenient minor adjustments of the stator position so that it aligns properly with the cup-shaped rotor 17 to provide uniform air gaps between the rotor 17 and the respective stator core members 23 and 27.

Figure 2:
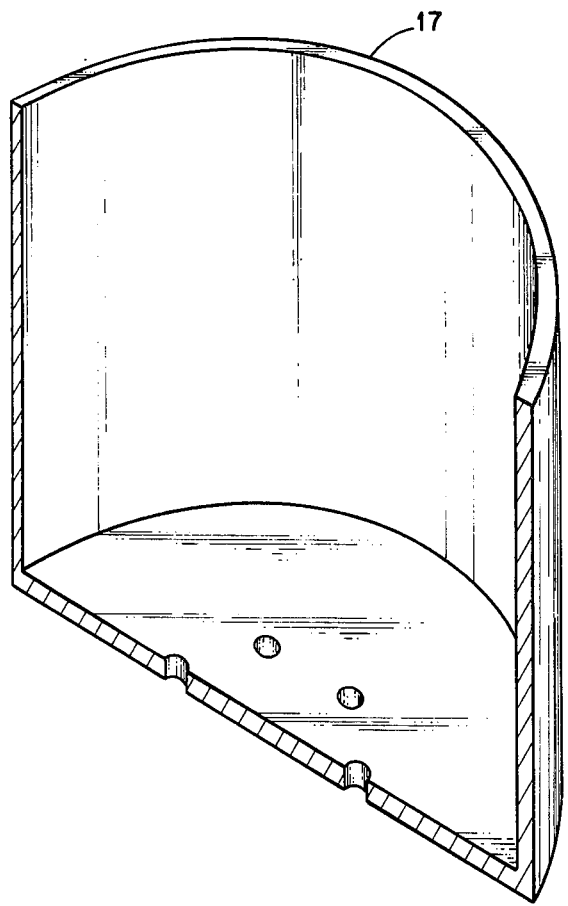
FIG. 2 is a sectioned pictorial view of the electrically conductive rotor of the eddy current drive motor arrangement of FIG. 1.

Referring now to FIG. 2, there is shown a detailed sectioned pictorial view of the cup-shaped rotor 17. The rotor 17 is machined from a solid piece of preferably high conductivity aluminum or copper. The wall of the cup is of a uniform thickness to aid in producing a smooth and uniform torque. The wall thickness is typically 0.150 inch. Since the rotor is constructed of an electrically conductive, non-magnetic material, such as aluminum or copper, there are no extraneous magnetic attraction forces operating on the rotor, and thus all the force is in the form of torque. Thus, vibrations in the stator, however produced, are not transmitted to the rotar 17 as is the case in a magnetically coupled drive or other similar type of drive system.

In operation, when the stator winding 25 is energized, a rotating magnetic field is established in the annulus around the rotor 17. The rate at which the magnetic field rotates is controlled by a variable frequency power supply in a conventional manner. Eddy currents are induced into the aluminum rotor which then, in the unloaded condition, follows the field. In the loaded condition a small amount of slip occurs. This slip is proportional to the amount of torque being produced. Thus, it will be seen that the torque supplied by the cup-shaped rotor 17 is transmitted to the airbearing spindle 5 substantially free from extraneous vibration which is inherent in prior art spindle drives.

This spindle drive arrangement may be made in rather large configurations to allow finish and semifinish machining of extremely precise contoured surfaces with optical quality finishes, such as large diameter metal mirrors for laser-optic systems with essentially no vibration transmitted to the spindle by means of the spindle-drive system.

Thus, it will be seen that a substantially vibration-free spindle-drive system has been provided for use in precision finish machining. Although the invention has been described by way of illustration of a preferred embodiment, it will be obvious to those skilled in the art that various modifications and changes may be made in the arrangement as described without departing from the spirit and scope of the present invention as set forth in the following claims attached to and forming a part of this specification.

What is claimed is:

1. A combination spindle-drive for a precision machining lathe comprising:
   a spindle having a rotatably disposed shaft adapted to carry a workpiece at one end of said shaft;
   a cup-shaped rotor supported in cantilever arrangement from the opposite end of said shaft by affixing the base of said cup-shaped rotor concentrically to the said opposite end of said shaft so that the walls of said cup-shaped rotor extend axially from said opposite end of said shaft, said rotor composed of an electrically conductive, non-magnetic material;
   a stator disposed coaxially about the walls of said cup-shaped rotor in an adjacent spaced relationship from said rotor, to form air gaps along the outer and inner walls of the said cup-shaped rotor, said stator having an outer core member disposed adjacent the outer wall of said cup and provided with a polyphase AC winding for applying a rotating magnetic field to said rotor and an inner core member disposed adjacent the inner wall of said cup-shaped rotor, said inner core member magnetically coupled to said outer core member so that the magnetic flux produced by said winding circulates through the walls of said cup-shaped rotor to produce torque on said rotor due to the reaction of eddy currents induced in said rotor by said rotating magnetic field.

2. The combination as set forth in claim 1 wherein said spindle is an airbearing spindle.

3. The combination as set forth in claim 2 wherein said cup-shaped rotor is composed of aluminum.

4. The combination as set forth in claim 3 wherein said winding is a three-phase twelve pole winding for producing a smooth uniform torque.

* * * * *